United States Patent [19]

Strong

[11] 3,978,151

[45] Aug. 31, 1976

[54] HIGH-FUNCTIONAL POLYMERCAPTAN RESINS IN EPOXY/ANHYDRIDE RESIN COMPOSITIONS

[75] Inventor: Douglas H. Strong, Mentor, Ohio

[73] Assignee: Diamond Shamrock Corporation, Cleveland, Ohio

[22] Filed: Sept. 27, 1974

[21] Appl. No.: 509,750

Related U.S. Application Data

[63] Continuation of Ser. No. 322,366, Jan. 10, 1973, abandoned.

[52] U.S. Cl. ............................ 260/830 S; 260/2 EC; 260/47 EC; 260/59 EP
[51] Int. Cl.² .................. C08L 63/00; C08L 63/02; C08L 63/04
[58] Field of Search .......... 260/830 S, 47 EC, 2 EC, 260/59 EP

[56] References Cited
UNITED STATES PATENTS

| | | | |
|---|---|---|---|
| 3,258,495 | 6/1966 | LeFave | 260/830 S |
| 3,340,236 | 9/1967 | Greenlee | 260/830 S |
| 3,423,480 | 1/1969 | Arnold | 260/830 S |
| 3,439,062 | 4/1969 | Adamek | 260/830 S |
| 3,472,913 | 10/1969 | Ephraim | 260/830 S |

OTHER PUBLICATIONS

Sealants; A. Damusis, Reinhold Publishing Co. 1967 pp. 208–209.

*Primary Examiner*—Carman J. Seccuro
*Attorney, Agent, or Firm*—John J. Freer

[57] ABSTRACT

Liquid, high-functional polymercaptan resins employed typically in sealants and adhesives, show excellent catalytic activity for preparing cured epoxy resin compositions from epoxy/anhydride systems. Blends of the epoxy resin with anhydrides and the high functional polymercaptan resins are adapted for room temperature curing into hard resinous compositions. Such compositions cured at ambient temperature show desirable hardness and achieve other characteristics such as reduced water absorption.

5 Claims, No Drawings

HIGH-FUNCTIONAL POLYMERCAPTAN RESINS IN EPOXY/ANHYDRIDE RESIN COMPOSITIONS

This is a continuation of application Ser. No. 322,366, filed Jan. 10, 1973, and now abandoned.

BACKGROUND OF THE INVENTION

The catalytic activity of tertiary amines in epoxy/anhydride compositions has been previously taught in U.S. Pat. No. 3,052,650. A particular object of the invention described therein is the formation of liquid epoxy resin compositions having extended pot life at normal room temperatures, which compositions may then be cured to a hard and tough state by heating for 1 or 2 hours at elevated temperatures on the order of 250° F.

The soluble tertiary amines in the epoxy/anhydride compositions serve to catalyze the curing of the overall blend to a hard and tough condition during the application of elevated temperature. There is a desirability, for example in connection with "in the field" application, for a system that will cure at ambient temperatures to a hardened state. It would also be desirable, particularly in such field applications, to move to substances that present reduced hazards in the field, and commensurately provide products involving minimum toxicity characteristics.

SUMMARY OF THE INVENTION

It has now been found that certain high-functional polymercaptan resins can be readily blended along with or in the epoxy resin and the anhydride to form blends adapted for ambient temperature curing. Such compositions can be easily and quickly mixed and applied in "on site" conditions; they further have the added advantage of reducing the toxicity problem associated with tertiary amines during such blending and application. Other desirable characteristics include cure hardness achieved at ambient temperature that is comparable to cure hardness for competitive systems which is arrived at under elevated temperature condition. Further characteristics include the option of obtaining lighter colored products as well as desirable properties for electrical applications for the cured products.

Broadly then, the present invention is directed to an epoxy resin composition adapted for room-temperature, accelerated and autogenous curing; such composition has a continuous liquid phase and comprises, among other components, a substance selected from the group consisting of polyglycidyl ether of a polyhydric phenol having a ratio of the hydroxyl groups to the 1,2-epoxy groups of not above about 2.5:2, cycloaliphatic epoxides, polyglycidyl ethers of novolac resins, and mixtures thereof. The composition components further include polycarboxylic acid anhydride in an amount sufficient to provide about 0.5–2 anhydride groups per 1,2-epoxy groups, which amount of anhydride is uniformly dispersed in the continuous liquid phase.

The last key component of the composition is liquid polymercaptan resin having an average SH functionality of greater than 2.5 and an average molecular weight between about 300–5,000; additionally, the resin is present in uniform dispersion in the liquid phase and in a catalytic amount within the range of from above about 3 to about 150 weight parts per 100 weight parts of the component named first hereinabove. The polymercaptan resin, moreover, has hydroxyl functionality in addition to the SH functionality. The three key components produce blends that are homogeneous, and cure autogenously, at ambient temperature.

In one aspect, the invention is further directed to the method of preparing a cured, epoxy resin composition, which cured composition is arrived at through accelerated, autogenous curing of the hereinabove described blend.

DESCRIPTION OF THE PREFERRED EMBODIMENTS

The epoxy resin component for the composition is contributed by one or more substances containing the 1,2-epoxy linkage. Such components can be supplied completely by substances that are epoxy ethers produced by the interreaction of an epihalohydrin with polyhydroxy compounds, and especially such reaction with polyhydroxy phenols. These particular epoxy resins therefore further refer to polyglycidyl ethers of polyhydric phenols. Such polyglycidyl ethers of polyhydric phenols must have, for purposes of this invention, a ratio of the hydroxyl groups to the 1,2-epoxy groups of not above about 2.5:2. A useful substance representative of these particular epoxy resins is 2,2-bis [4-(2′,3′-epoxy propoxy) phenyl] propane.

The epoxy resin component can further be supplied by cycloaliphatic epoxides. These are typically alicyclic diepoxides produced by the reaction of a peracid, such as peracetic acid, and an alicyclic carboxylate. The carboxylate in turn can be prepared by condensation of an aldehyde; for example, a suitable carboxylate for subsequent reaction with a peracid is prepared by the Tischenko condensation of tetrahydrobenzaldehyde.

An additional useful epoxy resin component for the composition can be contributed by polyglycidyl ethers of novolac resins. The novolac resins are produced by reaction of formaldehyde with a phenol, for example alkyl phenols or aryl phenols or polyhydroxy phenols. The resulting polyglycidyl ethers are then prepared by the reaction of an epihalohydrin, most usually epichlorohydrin. It is further contemplated to use mixtures of these epoxy resin substances to supply the epoxy resin component for the autogenously curing composition.

These epoxy resins to be most useful are liquid at ambient temperature and can be readily blended with additional ingredients to form hardened compositions. The known class of agents for this purpose that are useful in this invention are the polycarboxylic acid anhydrides, i.e., other than the monocarboxylic acid anhydrides. However, the use of such an anhydride should be accompanied with a further catalytic agent, in this case the high functional polymercaptan resins.

It is known with the epoxy/anhydride systems that if the polyglycidyl ethers of polyhydric phenol epoxy resins have a ratio of the hydroxyl groups to the 1,2-epoxy groups of above about 2.5:2, such resins will be solid at ambient temperature and undesirably intractable at initiating a reasonably satisfactory epoxy-anhydride reaction even with varying amounts of catalyst. If the polycarboxylic acid anhydride is diabasic, about 0.5–2 mols of anhydride per equivalent of epoxide will be useful. But it is recognized that with a dianhydride such as pyromellitic dianhydride, lesser amounts may be useful.

For enhancing the curing of the component blend, the anhydride is advantageously one that is liquid at ambient temperature and may be readily and easily dispersed in the epoxy resin to quickly form a homogenous blend. Such blends for best accelerated autogenous curing are those obtained by dissolving the anhydride in the epoxy resin. Hence, preferably, the anhydride is one which can be readily dissolved in such epoxy resin at ambient temperature.

As many of the useful anhydrides are solids at normal temperatures and therefore difficult to blend with a liquid epoxy resin, a known technique that may be employed in the practice of this invention is the preblending of anhydrides to form liquid eutectic mixtures. Thus, with an anhydride such as maleic anhydride which is normally a solid, i.e., melting under normal conditions at about 52° C., such can be employed in a eutectic mixture. For example, 25 weight parts of such anhydride with 75 weight parts of methyl endomethylene tetrahydrophthalic anhydride will form a liquid eutectic mixture at ambient temperatures.

Another technique for handling a solid anhydride substance and that can be useful in forming a component blend having a continuous liquid phase, as well as one which will cure at ambient temperature, is to first heat the solid anhydride and thereby liquify it at elevated temperature. At such temperature the resulting liquified substance can be blended with epoxy resin, or may be blended with the liquid polymercaptan resin, or both. Such technique is highly serviceable so long as a homogenous dispersion of ingredients results, and provides a dispersion having a continuous liquid phase when the blend of components is permitted to cool down to normal temperatures. In this technique, so long as the above mentioned criteria are established, the liquified anhydride could be, for example, blended at elevated temperature with liquid epoxy, the blend cooled to ambient temperature and then the polymercaptan resin subsequently admixed with the blend.

In general, the anhydrides that may be used and have been used in the practice of the invention include such anhydrides that are in liquid condition under normal conditions as well as such anhydrides that are solid under these conditions but may be useful in eutectic mixtures. As some commercially available mixtures are proprietary, it is not ostensibly feasible to provide an exhaustive list of all useful substances. However, without attempting to be complete, useful anhydrides include phthalic anhydride, hexahydrophthalic anhydride, methyl endomethylene tetrahydrophthalic anhydride, tetrahydrophthalic anhydride, maleic anhydride, tetramethylene maleic anhydride, dodecenylsuccinic anhydride, pyromellitic dianhydride, hexachloroendomethylene tetrahydrophthalic anhydride, trimellitic anhydride, and mixtures thereof.

The polymercaptan resin component is supplied by liquid polymeric materials having an average SH functionality of greater than 2.5. Preferably, for enhancing the autogenous cure at ambient temperature, such resin has SH functionality of about 3 or more, for example 6 or more, although typically such is below about 6 for economy. Also, such resins have hydroxyl functionality; for cure enhancement, this hydroxyl functionality is preferably on the carbons that are in the position alpha to the carbon atoms bearing the SH functionality. Further, the polymers preferably have 2 or more hydroxyl groups per molecule, e.g., 2-5 such groups per molecule.

Exemplary polymercaptan resins have been shown, for example, in U.S. Pat. Nos. 3,361,723 as well as 3,472,913. Moreover, as has been described in some detail in the last mentioned U.S. patent, exemplary polymercaptan resins can also be prepared in accordance with the teachings of U.S. Pat. Nos. 3,258,495 and 3,278,496, and ostensibly under certain steps disclosed in U.S. Pat. No. 2,581,464. As will be seen from a review of this exemplary U.S. Patent art, the molecular precursor to the polymercaptan resin typically contains three or more groups of the following structure $-CH(OH)CH_2Cl$. From this type of structure, mercaptan termination is derived by replacing the chloride with sulfhydrate, as for example reaction with an alkali metal sulfhydrate such as sodium sulfhydrate. This reaction does not seem to disturb the hydroxyl constituency on the carbon atom that is in the alpha position to the carbon atom on which the replacement reaction takes place. These polymercaptan resins, in liquid condition, have molecular weight of between about 300–5,000, and most typically between about 500–3,000. Such resins are virtually, to completely, free from polysulfide linkages.

For economy, a particularly preferred polymercaptan is one prepared from polyepoxides such as polyepoxy-containing polymeric reaction products prepared from a halogen-containing epoxide reacted with an aliphatic polyhydric alcohol. The polymercaptan resin is typically present in the blend of components in amounts from above about 3 to about 150 weight parts, basis 100 weight parts of the epoxy resin component. Less than about 3 weight part polymercaptan resin is generally insufficient to achieve a desirably cured composition, while greater than 150 weight parts of the polymercaptan resin can be uneconomical. Typically, the polymercaptan resin is present in an amount between about 5–50 weight parts, and preferably in an amount of at least 10–35 weight parts, basis 100 weight parts epoxy resin. In addition to the above discussed materials, the resinous blend may most usually contain other resinous materials as well as substances exemplified by pigments, fillers, brighteners, plasticizers, diluents, dyes, as well as other additives or components which may be formulated into such compositions.

When the blend of components is prepared, such blends even in fresh condition are ready for immediate and desirable autogenous curing at ambient temperatures. Such compositions thus exhibit particular utility for on site application and will achieve rapid curing, i.e., within only several days time, even at temperatures below 40° C. However, as has been more particularly taught hereinafter in the examples, ambient temperatures on the order of only 20°–30° C. are needed for autogenous curing of prepared blends. Such blends further have a continuous liquid phase that provides ease of application after on-site preparation. All three key ingredients may contribute to such liquid phase, e.g., the anhydride can be one that dissolves in the epoxy resin component and this resulting solution is then intimately mixed with liquid polymercaptan resin. Or the components that are not directly contributing to the liquid of the continuous phase can be dispersed therein and such phase is contributed to or supplied by the other components.

The following examples show ways in which the invention has been practiced but should not be construed as limiting the invention.

EXAMPLE 1

The polymercaptan resin employed is a mercaptan terminated liquid polymer having a viscosity of about 11,400–11,800 centipoises as measured at 25°C. with a Brookfield Viscometer Model RVT using a No. 6 spindle at 20 r.p.m. This resin further has a mercaptan equivalent, expressed as milliequivalents of SH functionality per gram of resin, of about 3.58 as measured by iodimetric titration, a specific gravity of 1.15, and an average of about 3 —OH groups per molecule. The resin is prepared in accordance with the teachings of U.S. Pat. No. 3,278,496 by reacting a hydroxy terminated liquid polyoxyalkylene glycol polymer having a molecular weight of about 400 with a halogenated epi-compound and then subsequently with a sulfur-contained reactant. The resin contains about three SH groups per molecule and has OH groups on the carbons that are in the position alpha to the carbon atoms having the SH functionality.

The liquid epoxy resin used is a light straw-colored, medium viscosity, unmodified epoxy resin that is capable of being cured by anhydrides. The liquid epoxy resin has a viscosity of 12,000–16,000 centipoises at 25°C, an epoxy value of 0.51–0.54 equivalent per hundred grams, and a weight per gallon of 9.6–9.8 lbs. For comparative testing, the curing agent employed, as a replacement for the polymercaptan resin, is 2,4,6-tris(-dimethylaminomethyl) phenol (Amine catalyst).

For each blend of materials, and the ingredients for each blend are more particularly shown in the table below, the anhydride employed is methyl endomethylene tetrahydrophthalic anhydride (META anhydride) which is a liquid material at ambient temperature. In the table below the various blends of ingredients shown are prepared by simply mixing the ingredients together with vigorous agitation in suitable containers; the blends of ingredients are thereafter permitted to cure under the conditions shown. Representative comparative samples from each of the cured blends, including samples from blends cured under varying conditions, all as shown on table below, are then subjected to a durometer hardness test.

For this test a Type D instrument is used, which is manufactured by Shore Instrument and Manufacturing Co. Inc., and which instrument has been shown an ASTM D2240-68, 1972 edition, part 27, page 658–661. For convenience, the hardness data received from such an instrument is referred to herein as the "Shore D" hardness.

Also, as shown in the table below, representative, comparative samples of each cured blend are immersed for varying lengths of time in water. This is distilled water that is maintained at 75°F with no agitation. Following immersion of samples in water, the samples are removed, dried to remove surface water, then weighted and thereafter subjected to the Shore D hardness test. The results of such testing have been reported in the table.

TABLE 1

| Ingredients, Weight Parts | Blends | | | | |
|---|---|---|---|---|---|
| | 1 | 2 | 3 | 4 | 5 |
| Epoxy Resin | 100 | 100 | 100 | 100 | 100 |
| Polymercaptan Resin | -0- | -0- | 15 | 20 | 25 |
| META Anhydride | 85 | 85 | 76 | 74 | 71 |
| Amine Catalyst | -0- | 3 | -0- | -0- | -0- |
| | Shore D Hardness | | | | |
| 7-Day Cure at 75°F. | no cure | 84 | 82 | 86 | 86 |
| After Water Immersion: | | | | | |
| For: 1 month | — | 88 | 85 | 87 | 88 |
| 3 months | — | 86 | 88 | 88 | 87 |
| 6 months | — | 85 | 88 | 87 | 87 |
| 2-Hours Cure at 285°F. | no cure | 89 | 80 | 86 | 87 |
| After Water Immersion: | | | | | |
| for: 1 month | — | 89 | 85 | 87 | 86 |
| 3 months | — | 88 | 82 | 85 | 86 |
| 6 months | — | 88 | 82 | 85 | 86 |
| 7-Day, 75°C Cure After Water Immersion: | Percent Change in Weight | | | | |
| For: 1 month | — | +1.7 | +0.4 | +0.5 | +0.5 |
| 3 months | — | +4.5 | +0.8 | +0.8 | +0.9 |
| 6 months | — | +9.2 | +1.1 | +1.2 | +1.2 |
| 2-Hour, 285°F. Cure After Water Immersion: | | | | | |
| For: 1 month | — | +0.4 | +0.4 | +0.5 | +0.5 |
| 3 months | — | +0.6 | +0.9 | +0.9 | +0.8 |
| 6 months | — | +0.8 | +1.2 | +1.2 | +1.1 |

As can be seen from the results recorded in the table above the anhydride alone, i.e., the META anhydride in Blend 1, is incapable of curing the epoxy resin either under the conditions of room temperature or at the elevated 285°F. However, the amine catalyst used in recommended manner, and the polymercaptan resin are each capable of providing curing of the epoxy resin.

The subsequent water submersion tests disclose that the blend cured at room temperature with the amine catalyst will provide for an undesirable rapid absorption of water in the only three months of submersion testing. On the other hand, the polymercaptan resin accelerator, and even for the room temperature cured compositions, i.e. cured at 75°F., provides for more desirable, minimal water absorption. Such water absorption is equated to the amine catalyzed composition absorption, but only when such amine composition is cured at augmented temperature, i.e., at the elevated 285°F.

EXAMPLE 2

By using the polymercaptan resin of Example 1 and the epoxy resin of Example 1 in the manner of Example 1, additional blends are prepared as shown in the table below. For these blends, however, the anhydride employed is dodecenyl succinic anhydride (DDS anhydride). Also, as shown on the table below, a comparative blend is prepared that contains the amine catalyst in recommended amount. Also reported in the table below are the results for the Shore D hardness testing and for the water submersion testing, both conducted in the manner discussed in Example 1.

TABLE 2

| Ingredients, Weight Parts | Blends | |
|---|---|---|
| | 1 | 2 |
| Expoxy Resin | 100 | 100 |
| Polymercaptan Resin | -0- | 50 |
| DDS Anhydride | 140 | 93 |
| Amine Catalyst | 3 | -0- |
| | Shore D Hardness | |
| 7-Day Cure at 75°F. | 76 | 78 |
| After Water Immersion | | |
| For: one month | 83 | 79 |
| three months | 84 | 81 |
| six months | 83 | 81 |
| 2-Hour Cure at 250°F. | 83 | 81 |
| After Water Immersion | | |
| For: one month | 81 | 80 |
| three months | 82 | 82 |
| six months | 82 | 82 |
| 7-Day, 75°F. Cure | Percent Change In Weight | |
| Plus: one month in water | +0.6 | +0.6 |
| three months in water | +0.9 | +1.0 |
| six months in water | +1.2 | +1.1 |
| 2-Hour, 250°F. Cure | | |
| Plus: one month in water | +0.3 | +0.5 |
| three months in water | +0.5 | +0.7 |

TABLE 2-continued

| | | |
|---|---|---|
| six months in water | +0.5 | +1.0 |

The tabulated results show that results obtained through use in a comparative blend of commercial amine catalyst, and for elevated temperature curing, are essentially consistently duplicated, even at low temperature curing for compositions which are free from amine catalyst but which contain the greatly extended amount of the polymercaptan resin.

EXAMPLE 3

By using 100 parts-by-weight of the epoxy resin of Example 1 and 85 parts-by-weight of the anhydride of Example 1, a composition ("Control") is prepared for testing. Further, by blending 25 weight parts of the polymercaptan resin of Example 1 with an additional batch of the Control, there is then prepared a new composition ("High Functional Polymercaptan") for testing. In addition to the Control blend, another comparative blend is formulated for testing with polymercaptan resin that is not contemplated for use in compositions of the present invention.

This comparative polymercaptan resin is a water-white liquid having a pH of 5.8, a molecular weight of about 6,000 and a mercaptan equivalent, expressed as milliequivalents of SH functionality per gram of resin of 0.35. However, this comparative polymercaptan resin has an average SH functionality per molecule of only about 2.3. Along with 100 weight parts of the Example 1 epoxy resin and 75 weight parts of the Example 1 anhydride, there is used 25 weight parts of this comparative polymercaptan resin to form a composition ("Comparative Polymercaptan") for testing.

A further composition not illustrative of the present invention is prepared by blending with 100 weight parts of the Example 1 epoxy and 85 weight parts of the Example 1 anhydride, 25 weight parts of a polysulfide liquid polymer. The resulting comparative composition ("Comparative Polysulfide") contains 25 weight parts of a commercially available polysulfide liquid polymer manufactured by Thiokol Chemical Corporation and designated as their LP-3. Such liquid polymer contains disulfide linkages and therefore does not prepare compositions contemplated in the present invention. Further, this polymer has an average molecular weight of about 1,000, a viscosity in poises at 25°C of 10, and a specific gravity (20°/20°) of 1.27.

Cures of selected samples of all these resulting blends, including the High Functional Polymercaptan blend which is the only composition that is representative of the present invention, as shown in the table below, are attempted. On some samples such attempted cure is at room temperature condition. Additionally, where more than a liquid is obtained during attempted cure, Shore D hardness testing is conducted on the test blends in the manner discussed in Example 1. Results for this hardness testing are also shown in Table 3 below.

TABLE 3

| Blend | Cure Condition & Hardness 6 Hrs. at 270°F | Shore D | Cure Condition & Hardness Room Temp. One Week | Shore D |
|---|---|---|---|---|
| Control | liquid | N.M. | liquid | N.M. |
| Comparative Polymercaptan | viscous liquid | N.M. | liquid | N.M. |
| Comparative Polysulfide | cured | 75 | skinned liquid | N.M. |
| High Functional Polymercaptan | cured | 85 | cured | 65 |

N.M. = Not measurable owing to liquid condition.

The tabulated results with the Control clearly indicate that some catalyst needs to be present to provide for curing of the epoxy/anhydride blends even under elevated temperature conditions for an extended period. The results further show that although elevated temperature conditions may provide for cured products among comparative blends, only the blended composition representative of the present invention will achieve ambient temperature cure within the 1 week test period. It is further noteworthy that the Comparative Polymercaptan does not provide for a cured blend either at ambient temperature for 1 week or at elevated temperature in 6 hours.

EXAMPLE 4

A test blend is prepared from 88 weight parts of the anhydride of Example 1 with the 100 weight parts of an epoxy novolac resin. This resin is an amber-colored, polyfunctional thermosetting resin having an epoxide functionality per molecule of about 2.0. It has a viscosity of 14–20 poises at 52°C., a density of 1.21 grams per milliliter at 20°C., and a weight per epoxide of 172–179 grams. The resulting composition (Control,) of epoxy and anhydride without more, is used for control purposes.

An additional blend containing 100 weight parts of the just-described epoxy novolac resin and 88 weight parts of the Example 1 anhydride is further prepared to also contain 1.5 weight parts of benzyl dimethyl amine catalyst. This blend ("Amine Catalyst") is used for comparative purposes as representative of formulations catalyzed with amine.

A composition illustrative of the present invention ("First High Functional") is prepared by using 25 weight parts of the polymercaptan resin of Example 1 with 100 weight parts of the epoxy novolac resin and 88 weight parts of the Example 1 anhydride. An additional formulation of the present invention ("Second High Functional") is prepared with 25 weight parts of the polymercaptan resin of Example 1 and 100 weight parts of the epoxy novolac resin. But this composition contains only 73 weight parts of the Example 1 anhydride.

As shown in Table 4 below, elevated temperature cures for 6 hours are attempted on samples from all these compositions. Also, as shown in the table below, Shore D hardness testing results are obtained for compositions cured under such conditions. Further, selected samples of these blends are also chosen for attempted curing in 1 week at room temperature. Results of such attempts to cure are also shown in Table 4 below, along with the Shore D hardness testing results where such results are obtainable.

TABLE 4

| Blend | Cure Condition & Hardness | | Cure Condition & Hardness | |
|---|---|---|---|---|
| | 6 Hours at 270°F. | Shore D | One Week Room Temp. | Shore D |
| Control | liquid | N.M. | liquid | N.M. |
| Amine Catalyst | cured | 87 | soft gel | N.M. |
| First High Functional | cured | 87 | cured | 50 |
| Second High Functional | cured | 87 | cured | 60 |

N.M. = Not measurable owing to liquid condition.

The above tabulated results with the Control demonstrate the necessity for catalyzing the epoxy/anhydride system and further that such catalyzing with a representative amine catalyst at recommended amount can be effective under elevated temperature cure condition. However, such amine catalyst, as reported in the table, is not readily effective at ambient temperature. But the blends containing high functional polymercaptan resin, thus representative of the present invention, are cured within one week at ambient temperature.

Further ambient temperature cures are obtained for compositions containing 25–50 weight parts of the polymercaptan resin of Example 1 with 75 weight parts of the anhydride of Example 1 but employing 100 weight parts of epoxy resin that is representative of a cycloaliphatic epoxy resin. Such ambient temperature curing, although not achieved as rapidly as with the above described epoxy novolac resin, is nevertheless obtained at room temperature where the representative cycloaliphatic epoxy resin is an alicyclic diepoxy adipate resin. This particular resin has a viscosity in centipoises at 25°C of 900, a weight per epoxide of 213 grams, and an epoxy value of 0.47 equivalents per 100 grams. Such compositions containing high functional polymercaptan resin plus anhydride and with the cycloaliphatic epoxy resin are also cured, as with conventionally catalyzed epoxy/anhydride systems, at elevated temperature.

I claim:

1. The method of preparing a cured, epoxy resin composition, wherein said epoxy resin will cure at elevated temperature with tertiary amine catalyst to a hard product, which preparation is achieved through accelerated and autogenous curing to said hard product at the situs of the application of the composition and at the ambient, non-elevated temperature of said situs, said method comprising:
   1. blending together a uniform composition of continuous liquid phase and free from said amine catalyst, said composition having reactants that participate in the curing consisting essentially of:
      A. substance selected from the group consisting of polyglycidyl ether of a polyhydric phenol having a ratio of hydroxyl groups to 1,2-epoxy groups of not above about 2.5:2, cycloaliphatic epoxides, polyglycidyl ethers of novalac resin, and mixtures thereof;
      B. polycarboxylic acid anhydride in an amount sufficient to provide about 0.5–2 anhydride groups per 1,2-epoxy group, which amount of anhydride is uniformly dispersed in said continuous liquid phase; and
      C. liquid polymercaptan resin having an average SH functionality of greater than 2.5 and an average molecular weight between about 300–5,000, said resin being present in uniform dispersion in said liquid phase and in a catalytic amount within the range of from above about 3 to about 150 weight parts per 100 weight parts of said (A) component, with said polymercaptan resin having hydroxyl functionality in addition to said SH functionality; and
   2. applying the resulting uniform composition while permitting autogenous curing of same at the ambient temperature of the situs of application to thereby prepare said hard product.

2. The method of claim 1 wherein there is first prepared a liquid eutectic mixture of polycarboxylic acid anhydrides and the resulting liquid eutectic mixture is thereafter mixed with said part (A) and part (C) components.

3. The method of claim 1 wherein said part (B) and said part (C) components are first blended together and the resulting blend is thereafter admixed with said part (A) component.

4. A hard, cured epoxy resin composition prepared by the method of claim 1.

5. The method of initiating catalytic, autogenous curing of epoxy resin composition at the situs of the application of the composition and at the ambient, non-elevated temperature of said situs, said composition having continuous liquid phase and comprising substance selected from the group consisting of polyglycidyl ether of a polyhydric phenol having a ratio of hydroxyl groups to 1,2-epoxy groups of not above about 2.5:2, cycloaliphatic epoxides, polyglycidyl ethers of novalac resin, and mixtures thereof, wherein said epoxy resin will cure at elevated temperature with tertiary amine catalyst to a hard product, and said method provides curing to a hard product of uniform blends containing said epoxy resin and free from said amine catalyst, which method comprises:
admixing with said resin, at the situs of the application of said composition, reactants participating in the curing and consisting essentially of:
   1. polycarboxylic acid anhydride in an amount sufficient to provide about 0.5–2 anhydride groups per 1,2-epoxy group, which amount of anhydride is uniformly dispersed in said continuous liquid phase; and
   2. liquid polymercaptan resin having an average SH functionality of greater than 2.5 and and average molecular weight between about 300–5,000, said resin being present in uniform dispersion in said liquid phase and in a catalytic amount within the range of from above about 3 to about 150 weight parts per 100 weight parts of said epoxy resin, with said polymercaptan resin having hydroxyl functionality in addition to said SH functionality;
and thereafter permitting autogenous curing at the ambient temperature of said situs.

* * * * *